No. 782,846. PATENTED FEB. 21, 1905.
G. GRAY.
WINDLASS OPERATING MECHANISM.
APPLICATION FILED JUNE 3, 1904.
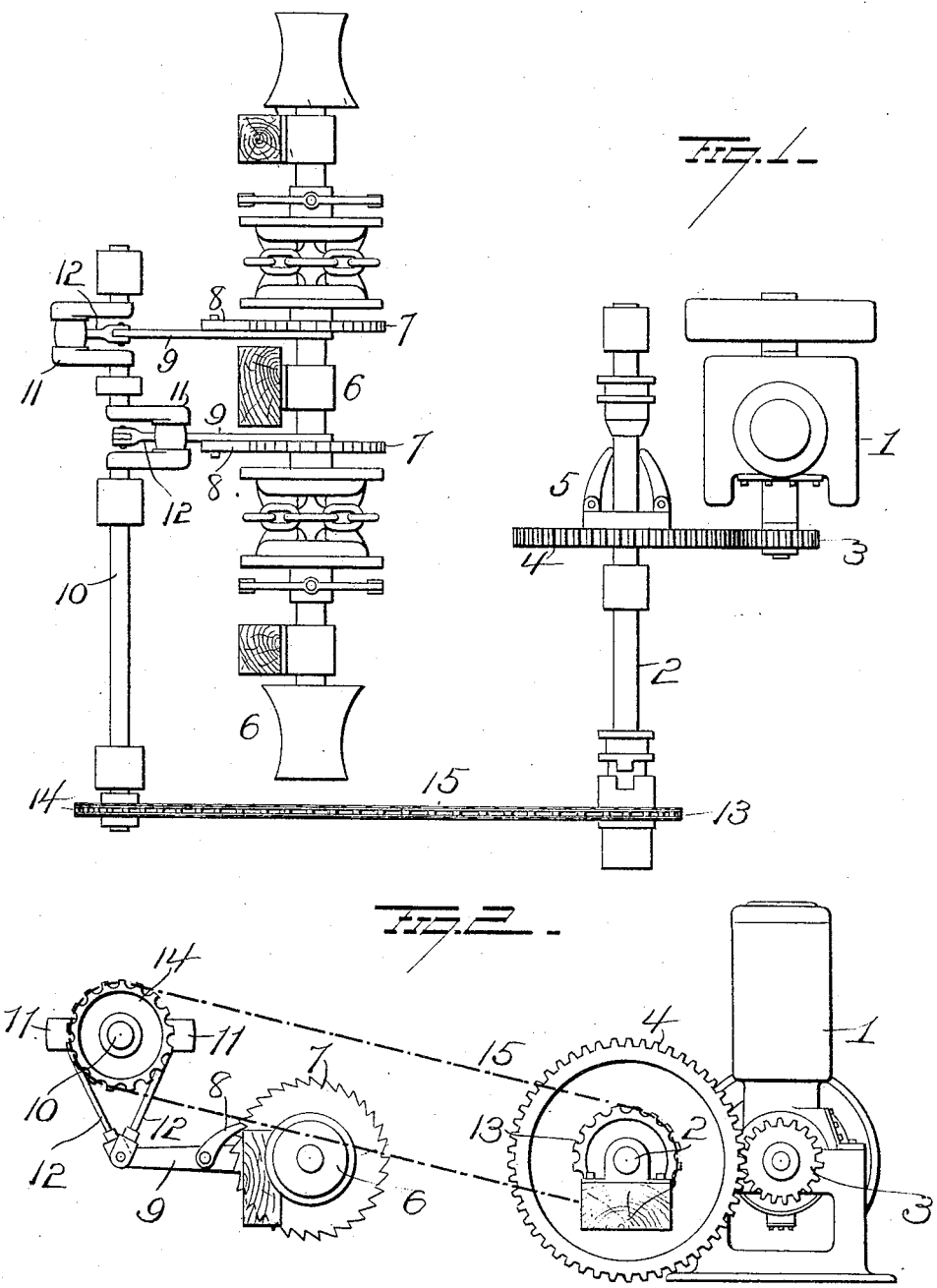
WITNESSES
E. Nottingham
G. F. Downing
INVENTOR
George Gray
By H. A. Seymour
Attorney No. 782,846.　　　　　　　　　　　　　　　　　　　　Patented February 21, 1905.

UNITED STATES PATENT OFFICE.

GEORGE GRAY, OF MIANUS, CONNECTICUT, ASSIGNOR OF ONE-HALF TO CHARLES B. ALLYN, OF MIANUS, CONNECTICUT.

WINDLASS-OPERATING MECHANISM.

SPECIFICATION forming part of Letters Patent No. 782,846, dated February 21, 1905.

Application filed June 3, 1904. Serial No. 211,047.

*To all whom it may concern:*

Be it known that I, GEORGE GRAY, a resident of Mianus, in the county of Fairfield and State of Connecticut, have invented certain new and useful Improvements in Windlass-Operating Mechanism; and I do hereby declare the following to be a full, clear, and exact description of the invention, such as will enable others skilled in the art to which it appertains to make and use the same.

My invention relates to an improved windlass-operating mechanism, the object of the invention being to provide simple and efficient mechanism operated by an engine or other source of power as distinguished from hand-power and which is especially adapted for use on shipboard; and it consists in certain novel features of construction and combinations and arrangements of parts, as will be more fully hereinafter described, and pointed out in the claim.

In the accompanying drawings, Figure 1 is a plan view illustrating my improvements, and Fig. 2 is a view in side elevation.

1 represents a motor or engine of any approved construction which transmits motion to a counter-shaft 2 through gears 3 and 4, the latter loose on shaft 2 and secured thereto by a friction-clutch 5 under the control of the operator to enable the counter-shaft to be stopped at will.

6 represents a windlass of ordinary construction, having ratchet-wheels 7 thereon, engaged by pivoted dogs 8 on arms 9 and turned when said arms are oscillated, as is well understood.

10 is a crank-shaft provided with crank-arms 11, on which are located pivoted links 12, pivotally connected with arms 9, so that when the shaft turns the arms will be oscillated and the windlass turned. Shafts 2 and 10 are provided with sprocket-wheels 13 and 14, respectively, connected by an endless chain 15 for transmission of motion from one to the other.

The operation of my improvements is as follows: Counter-shaft 2 is driven by motor 1 and transmits motion through the medium of chain 15 to shaft 10, and the latter, through the medium of pivoted links 12, alternately raise and lower the arms 9, and the dogs 8 turn the ratchet-wheels 7 in one direction and ride over them in the other direction, thus turning the windlass.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

The combination with a windlass, of a crank-shaft located in proximity thereto, ratchet-wheels carried by the windlass, pivoted arms, pivoted dogs on said arms engaging the ratchet-wheels, links connecting said arms with the arms of the crank-shaft, a counter-shaft, an endless chain transmitting motion from the counter-shaft to the crank-shaft, a motor, a gear on the counter-shaft receiving motion from the motor, and a friction-clutch for locking said gear to the counter-shaft or releasing it therefrom.

In testimony whereof I have signed this specification in the presence of two subscribing witnesses.

GEORGE GRAY.

Witnesses:
　CHARLES A. NEWMAN,
　A. F. SCOTT.